Patented Aug. 29, 1933

1,924,696

UNITED STATES PATENT OFFICE 1,924,696

MANUFACTURE OF DYES CONTAINING CHROMIUM AND THE RESULTING PRODUCT

Ernest Albert Sack, Neuilly-sur-Seine, France, assignor to Compagne Nationale de Matieres Colorantes & Manufactures de Produits Chimiques du Nord Reunies, Etablissements Kuhlmann, Paris, France, a corporation of France No Drawing. Application June 18, 1930, Serial No. 462,142, and in France November 13, 1929

8 Claims. (Cl. 260—12)

In my application for Patent Serial No. 462,143 I have described a process of manufacture of chromium compounds of ortho-hydroxyazo dyestuffs by heating the latter with a solution of a chromium salt of a mineral acid (chromium sulphate for example) in the presence or absence of free mineral acid, and more particularly of sulphuric acid.

According to the present invention chromed azo dyes derived from amino-naphthols and pyrazolones and howsoever chromed are heated with dilute sulphuric acid and with or without added pressure. By this process some chromium is eliminated and new chromed dyes are produced whose shade is quite different from that of the initial chromed dye.

The following is an example illustrating the invention but without imposing limitations.

The red blue chromium compound, obtained in the absence of mineral acid, starting with 42.5 kgs. of the azo dye prepared by coupling the diazo compound of 1-amino-2-hydroxynaphthalene-4-sulphonic acid with 1-phenyl-3-methyl-5-pyrazolone, is heated in a sealed autoclave under pressure to 120° C. for 20 hours with 400 litres of water, to which is added 8 kgs. of sulphuric acid of 66° Bé.

On completion of the reaction an elimination of chromium is noted in the form of sulphate. The new chromium compound transformed into sodium salt after filtration and washing, colors wool under acid bath a bright rose, while the initial chromium compound used for dyeing in the same conditions gives a dull bluish red shade.

The new chromium compound is identical with that described in Example 1 of application Serial No. 462,143.

What I claim is:—

1. The manufacture of chromed dyes from red-blue chromium compounds of ortho-hydroxyazo dyes derived from pyrazolones, which consists in subjecting the same to the action of dilute sulphuric acid.

2. The manufacture of chromed dyes as claimed in claim 1, in which the reaction is effected in a sealed container under heat and pressure.

3. The manufacture of chromed dyes from red-blue chromium compounds of ortho-hydroxyazo dyes derived from pyrazolones and ortho-amino-hydroxy-naphthalene sulphonic acids, which consists in subjecting the same to the action of dilute sulphuric acid.

4. The manufacture of chromed dyes from red-blue chromium compounds of ortho-hydroxyazo dyes derived from 1-phenyl-3-methyl-5-pyrazolone and 1-amino-2-hydroxy-naphthalene-4-sulphonic acid, which consists in subjecting the same to the action of dilute sulphuric acid.

5. The manufacture of chromed dyes as claimed in claim 4, in which the reaction is effected under pressure at a temperature above 100° C. and not exceeding 130° C.

6. The dye obtained by elimination by sulphuric acid of a part of the chromium from red-blue chromed ortho-hydroxyazo dyes derived from pyrazolones.

7. The manufacture of chromed dyes as claimed in claim 4 in which the reaction is effected under pressure at a temperature of about 120° C.

8. The dyes of changed shade obtained by elimination by sulphuric acid of a part of the chromium from azo dyes derived from ortho-aminonaphtols and from pyrazolones.

ERNEST ALBERT SACK.